US007821376B2

(12) United States Patent
Song

(10) Patent No.: US 7,821,376 B2
(45) Date of Patent: Oct. 26, 2010

(54) METHOD FOR ADJUSTING TRIP SENSITIVITY OF THERMAL OVERLOAD PROTECTION APPARATUS

(75) Inventor: Ki-Bong Song, Chungcheongbuk-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 31 days.

(21) Appl. No.: 12/178,141

(22) Filed: Jul. 23, 2008

(65) Prior Publication Data

US 2009/0040005 A1 Feb. 12, 2009

(30) Foreign Application Priority Data

Aug. 7, 2007 (KR) ..................... 10-2007-0079235

(51) Int. Cl.
*H01H 71/74* (2006.01)
*H01H 71/16* (2006.01)
*H02H 5/04* (2006.01)

(52) U.S. Cl. ............................ 337/84; 337/36; 337/37; 337/82; 335/35; 335/45; 335/145; 335/173; 361/93.8; 361/105

(58) Field of Classification Search .................. 337/36, 337/37, 82, 84; 335/35, 45, 145, 173; 361/93.8, 361/105
See application file for complete search history.

(56) References Cited

U.S. PATENT DOCUMENTS 3,015,007 A * 12/1961 Howard ....................... 337/56
3,038,051 A * 6/1962 Howard ....................... 337/62
3,162,739 A * 12/1964 Klein et al. .................... 335/9
3,183,328 A * 5/1965 Wheeler ....................... 337/56
3,214,535 A * 10/1965 Koenig et al. ................. 335/37
3,251,966 A * 5/1966 Kussy et al. .................. 337/45
3,423,712 A * 1/1969 Howard ....................... 337/77
3,588,761 A * 6/1971 Heft et al. ...................... 335/16
4,603,312 A * 7/1986 Conner ........................ 335/42

(Continued)

FOREIGN PATENT DOCUMENTS

DE 1614675 7/1970

(Continued)

OTHER PUBLICATIONS

U.S. Appl. No. 12/178,118 to Lee, which was filed on Jul. 23, 2008.

*Primary Examiner*—Anatoly Vortman
(74) *Attorney, Agent, or Firm*—Greenblum & Bernstein, P.L.C.

(57) ABSTRACT

A method for adjusting a trip sensitivity in a thermal overload protection apparatus, including setting an adjusting reference point; measuring a normal position of bimetals; measuring a moving distance at a time of trip operation of a trip latch mechanism; deciding an assembling position of a shifter mechanism based on the measured moving distance at the time of trip operation of the trip latch mechanism, information on a trip distance between a pre-determined shifter mechanism and the trip latch mechanism and information on a size of the shifter mechanism; conducting a predetermined overcurrent to the thermal overload protection apparatus; measuring a conducting time of the overcurrent until a trip event; calculating a difference between the conducting time measured in the measuring step and a predetermined trip time by converting a rotation angle; and marking a graduation of a set trip operation current by the rotation angle calculated in the calculating step.

10 Claims, 5 Drawing Sheets

U.S. PATENT DOCUMENTS

| | | | | | |
|---|---|---|---|---|---|
| 4,635,020 | A | * | 1/1987 | Sako | 337/49 |
| 4,652,847 | A | * | 3/1987 | Sako | 337/49 |
| 4,763,096 | A | * | 8/1988 | Ingrain | 337/82 |
| 4,785,274 | A | * | 11/1988 | Sako et al. | 337/49 |
| 4,808,961 | A | * | 2/1989 | Sako et al. | 337/49 |
| 4,922,220 | A | * | 5/1990 | Livesey et al. | 337/82 |
| 4,983,939 | A | * | 1/1991 | Shea et al. | 335/42 |
| 5,054,754 | A | * | 10/1991 | Akiike et al. | 267/159 |
| 5,793,026 | A | * | 8/1998 | Kolberg et al. | 335/172 |
| 5,831,501 | A | * | 11/1998 | Kolberg et al. | 335/42 |
| 5,831,509 | A | * | 11/1998 | Elms et al. | 337/333 |
| 5,877,670 | A | * | 3/1999 | Sehlhorst et al. | 337/302 |
| 5,894,259 | A | * | 4/1999 | Kolberg et al. | 337/333 |
| 6,028,757 | A | | 2/2000 | Hartinger et al. | |
| 6,104,273 | A | * | 8/2000 | Larranaga et al. | 337/82 |
| 6,160,470 | A | * | 12/2000 | O'Carroll et al. | 337/82 |
| 6,225,881 | B1 | * | 5/2001 | Felden et al. | 335/172 |
| 6,445,274 | B1 | * | 9/2002 | Malingowski et al. | 337/49 |
| 6,459,355 | B1 | * | 10/2002 | Furuhata et al. | 337/52 |
| 6,496,097 | B2 | * | 12/2002 | Frank | 337/323 |
| 6,507,266 | B1 | * | 1/2003 | Bizard et al. | 337/349 |
| 6,621,403 | B2 | * | 9/2003 | Nagahiro et al. | 337/75 |
| 6,661,329 | B1 | * | 12/2003 | Gibson | 337/84 |
| 6,720,856 | B1 | * | 4/2004 | Pellon et al. | 337/82 |
| 6,816,055 | B2 | * | 11/2004 | Weber | 337/82 |
| 7,135,953 | B2 | * | 11/2006 | Leitl et al. | 337/84 |
| 7,248,140 | B2 | * | 7/2007 | Yu | 337/94 |
| 7,372,356 | B2 | * | 5/2008 | Lee | 337/360 |
| 2006/0077022 | A1 | | 4/2006 | Kim | |
| 2007/0075047 | A1 | | 4/2007 | Oh | |
| 2007/0075808 | A1 | | 4/2007 | Ahn | |
| 2008/0122563 | A1 | * | 5/2008 | Song | 335/176 |

FOREIGN PATENT DOCUMENTS

| | | | | |
|---|---|---|---|---|
| DE | 3544989 | A1 | * | 7/1987 |
| DE | 19619295 | | | 11/1997 |
| EP | 0833357 | | | 4/1998 |
| EP | 1229565 | | | 8/2002 |
| FR | 2667979 | | | 4/1992 |
| JP | 2009043727 | A | * | 2/2009 |
| WO | 2005/104160 | | | 11/2005 |

* cited by examiner

METHOD FOR ADJUSTING TRIP SENSITIVITY OF THERMAL OVERLOAD PROTECTION APPARATUS

BACKGROUND OF THE INVENTION

1. Field of the Invention

The present invention relates to an apparatus for protecting a motor from an overload (overcurrent), more particularly, to a method for setting and adjusting a trip sensitivity in a thermal overload protection apparatus.

2. Description of the Related Art

An overload protecting function, a basic function of a thermal overload trip apparatus, is implemented by performing a trip operation when an overload or overcurrent within a current range satisfying a pre-set condition for the trip operation is generated in an electric circuit. The current range may refer to a current range for the trip operation according to an IEC (International Electrotechnical Commission) standard specified as an international electrical standard. For example, a condition for the trip operation is that the trip operation should be performed within two hours when a current corresponding to 1.2 times a rated current is conducted in a circuit, and the trip operation should be performed for more than two hours and within several hours when a current corresponding to 1.05 times the rated current is conducted.

The thermal overload (overcurrent) trip apparatus generally includes a heater coil for generating heat when an overcurrent is generated, by being connected to the circuit and a bimetal winding about the heater coil so as to provide a driving force for a trip operation by being bent when the heater coil generates heat, as a driving actuator. One example of the thermal overload trip apparatus using the bimetal will be described with reference to FIGS. 1 and 2.

FIG. 1 is a diagram showing a configuration of a thermal overload trip apparatus in accordance with the related art, and FIG. 2 is a diagram showing a relation between an adjusting cam and a trip sensitivity adjusting range in the thermal overload trip apparatus in accordance with the related art.

In FIG. 1, a reference numeral 1 denotes bimetals. Here, three bimetals are provided so as to be connected to each circuit of three-phase AC. Thus, the bimetals are bent by heat from a heater coil (not shown) generating heat when an overcurrent is generated, and accordingly provide a driving force for a trip operation. A reference numeral 2 denotes a shifter mechanism. The shifter mechanism 2 transfers the driving force for the trip operation from the bimetals 1 and is movable in a horizontal direction in the plane of the drawing by contacting the bimetals 1 in right and left directions so as to receive the driving force provided from the bent bimetals 1. In FIG. 1, a reference numeral 3 denotes a trip mechanism. The trip mechanism 3 is biased to be rotated in a direction of the trip operation by a spring (reference numeral not given). In FIG. 1, a reference numeral 4 denotes a latch mechanism for releasing the trip mechanism 3 to be rotated in the direction of the trip operation or restricting the trip mechanism 3 not to be rotated in the direction of the trip operation. The latch mechanism 4 has one end portion facing a driving force transfer portion of the shifter mechanism 2 so as to receive the driving force from the shifter mechanism 2, another end portion disposed in a rotation path of the trip mechanism 3 so as to restrict or release the trip mechanism 3, and a middle portion therebetween supported by a rotation shaft (reference numeral not given) to be rotatable. A reference numeral 6 denotes a contact point between the trip mechanism 3 and the latch mechanism 4 at the restriction position. In FIG. 1, at a position contacting one portion of the latch mechanism 4, an adjusting knob mechanism 5 is disposed to be rotatable so as to displace the latch mechanism 4 to be closer to or to be distant from the shifter mechanism 2 resulting from variation of a contact pressure while contacting the latch mechanism 4. Here, the adjusting knob mechanism 5 includes a cam portion 9 having a radius varying according to a displacement angle of an outer circumference thereof, and an adjusting knob 10 coupled to the cam portion 9 or to integrally extended from the cam portion 9 so as to rotate the cam portion 9. In FIG. 1, a reference character y, as a bending displacement of the bimetals, indicates a predetermined displacement amount (distance) of the bending bimetals 1 when a predetermined overcurrent is conducted in the circuit. And, a reference numeral Δ y, as an allowance for trip operation, indicates a predetermined gap between the shifter mechanism 2 and the latch mechanism 4 when the shifter mechanism 2 is displaced by the pre-set bending amount y of the bimetals 1 caused by generation of the predetermined overcurrent. The allowance for trip operation is adjustable by the adjusting knob mechanism 5.

In the meantime, referring to FIG. 2, a configuration of the cam portion 9 included in the adjusting knob mechanism 5 in accordance with the related art will be described.

In FIG. 2, a reference character a indicates an adjustable cam range covering angles between a maximum trip operation insensitive adjusting position 12 and a maximum trip operation sensitive adjusting position 13. However, since a manufacturer of the thermal overload trip apparatus in the related art has adjusted an initial position of the cam portion 9 such as an initially-set position 11 for the cam portion 9 by rotating the adjusting knob 10 of FIG. 1 during manufacturing, a range allowing a user to substantially adjust the rotation angle of the cam portion 9 is a substantially-adjustable range b for the cam portion 9. In FIG. 2, a reference character c indicates an initially-set adjusting range for the cam.

Operation of the thermal overload trip apparatus in accordance with the related art will be described.

First, the trip operation will be described. When the heater coil (not shown) generates heat by the overcurrent on the circuit, the bimetals 1 are bent and moved rightward on the drawing. Accordingly, the shifter mechanism 2 is moved rightward in the plane of FIG. 1, that is in a shifter mechanism operating direction 7 applied when the overcurrent is generated by a value obtained by adding the allowance for trip operation Δ y to the bending amount y by the driving force of the bimetals 1 bent more than the value adding the allowance for trip operation Δ y to the bending amount y, accordingly the latch mechanism 4 is pressed rightward and then rotated in a counterclockwise direction in the plane of the drawing. Then, the trip mechanism 3 being restricted by the latch mechanism 4 is released and then rotated in the tripping direction, that is, in the counterclockwise direction by an elastic force of a spring (reference numeral not given), and accordingly a succeeding switching mechanism (not shown) is operated into a trip (circuit-opening) position and then the circuit is tripped (broken), thereby protecting the circuit and a load device.

Next, a sensitivity adjusting operation for the trip operation will be described with reference to FIGS. 1 and 2.

When the initial position of the cam portion 9 is adjusted such as the initially-set position 11 for the cam portion in FIG. 2, if the user rotates the cam portion 9 of FIG. 1 in the counterclockwise direction, the latch mechanism 4 is rotated in a clockwise direction centering the rotation shaft (reference numeral not given), that is, in a trip operation sensitivity adjusting direction 8, accordingly the allowance for trip operation Δ y becomes narrow and the trip operation sensitivity of the device with respect to the overcurrent increases.

In the above-mentioned thermal overcurrent trip apparatus according to the related art, the distance for adjusting a trip operation sensitivity of the device, that is, a bending amount y, is a very important factor for deciding whether or not the trip operation is implemented for an over load (overcurrent). And even though the trip operation is implemented by the cooperation between the trip load upon the trip apparatus and the elastic stress of the bimetal, an adjusting that reduces the remaining distance, which is the trip operation allowance Δy only to 0 (zero), has a drawback in that it is not capable of ensuring the reliability of a trip operation.

Moreover, adjusting the remaining distance between the shifter 2 and latch mechanism 4 (which is the trip operation allowance Δy, by an accurate distance, which is the accurate bending amount y that can be set,) works only if the manual rotating manipulation by a user is stopped at the exact instant when the trip apparatus operates to trip. However, the stop in the manual rotating manipulation has actually a very small velocity (not zero), so there is a drawback that a user manually rotating the knob cannot accurately adjust the sensitivity of the device.

SUMMARY OF THE INVENTION

Therefore, a non-limiting feature of the present invention is directed to providing a method for adjusting a trip sensitivity of a thermal overload protection apparatus which is capable of precisely and effectively adjusting a trip operation sensitivity at a time of an overload (overcurrent) occurrence.

To achieve these and other advantages and in accordance with the purpose of the present invention, as embodied and broadly described herein, there is provided a method for adjusting a trip sensitivity of a thermal overload protection apparatus, in the adjusting method of the thermal overload protection apparatus including bimetals for providing a driving force for trip operation by being bent when an overcurrent is conducted in a circuit, a shifter mechanism for transferring the driving force from the bimetals by contacting the same, a trip mechanism rotatable to a trip position at which the circuit is broken at a time of release, a trip latch mechanism movable to a position for releasing the trip mechanism from a position for restricting the trip mechanism by the driving force from the shifter mechanism, and an adjusting knob for adjusting a gap between the shifter mechanism and the trip latch mechanism, the method including, measuring a position of the bimetals and a moving distance at the time of trip operation of the trip latch mechanism so as to decide a gap between the shifter mechanism and the trip latch mechanism; deciding an installing position for the shifter mechanism based on the position information and distance information obtained by the measuring step and a predetermined trip distance information; processing the shifter mechanism according to the position information of the bimetals; installing the processed shifter mechanism at the decided installing position; and deciding a graduation position of a trip operation current value by converting a difference between a predetermined allowable trip operation time and a test-operated trip operation time into a rotation angle.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate preferred embodiments of the invention and together with the description serve to explain the principles of the invention.

In the drawings.

DETAILED DESCRIPTION OF THE INVENTION

A description will now be given in detail of the preferred embodiments of the present invention, examples of which are illustrated in the accompanying drawings.

Figure 3:
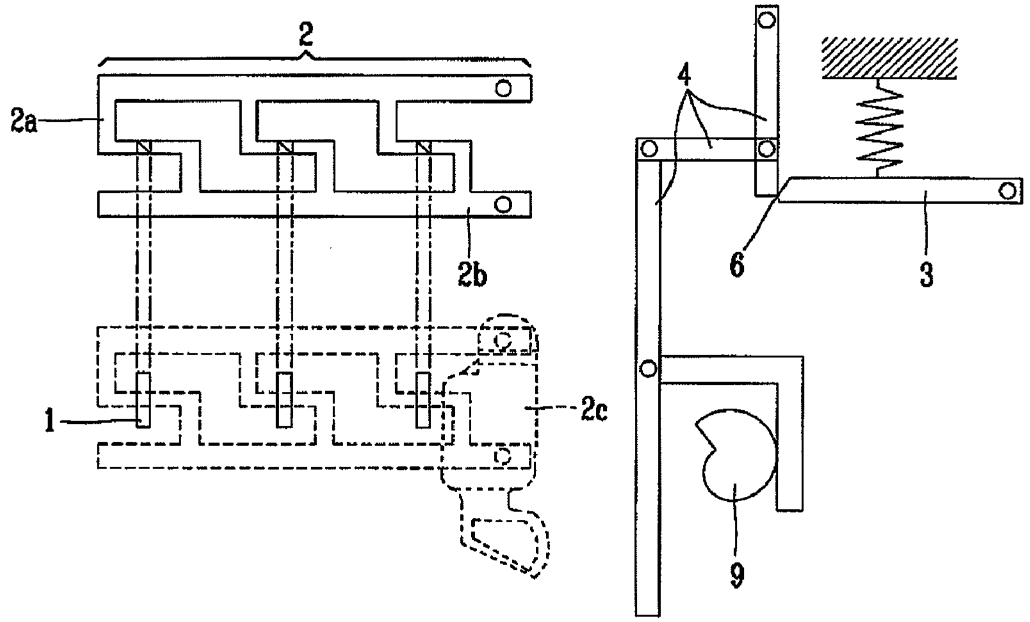
FIG. 3 is a diagram schematically showing a configuration of a thermal overload protection apparatus in accordance with the present invention.
Figure 4:
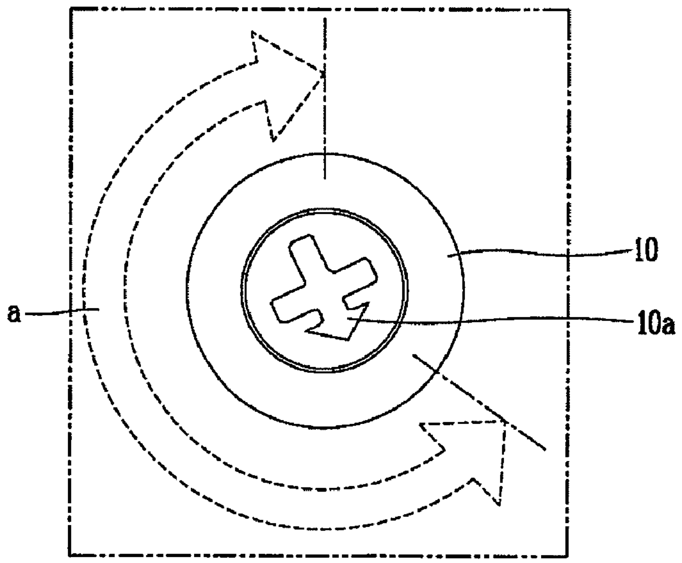
FIG. 4 is a diagram showing a relation between an adjusting knob and an adjusting area in the thermal overload protection apparatus in accordance with the present invention.
Figure 5:
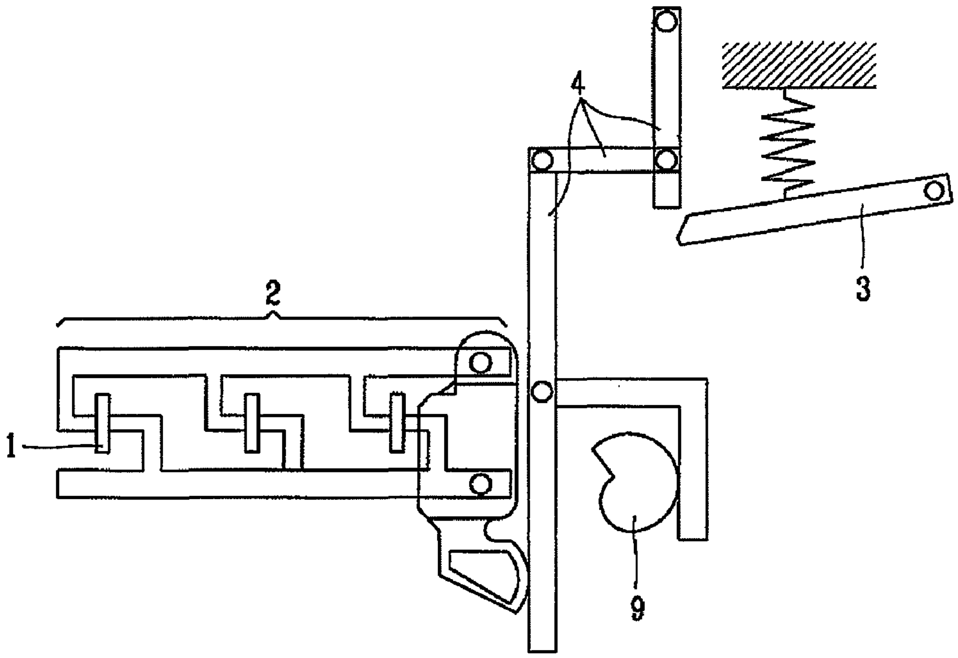
FIG. 5 is a view showing a moment that the thermal overload protection apparatus in accordance with the present invention performs a trip operation.

FIG. 3 is a diagram schematically showing a configuration of a thermal overload protection apparatus in accordance with the present invention, and FIG. 4 is a diagram showing a relation between an adjusting knob and an adjusting area in the thermal overload protection apparatus in accordance with the present invention, and FIG. 5 is a view showing a moment that the thermal overload protection apparatus in accordance with the present invention performs a trip operation.

Referring to FIGS. 3 to 5, a configuration of the thermal overload protection apparatus in accordance with the present invention and operation thereof will be described.

The thermal overload protection apparatus in accordance with the present invention includes bimetals 1 for providing a driving force for a trip operation by bending when an overcurrent is conducted in a circuit, a shifter mechanism 2 for transferring the driving force from the bimetals 1 by contacting the same, a trip mechanism 3 rotatable to a trip position at which the circuit is broken at a time of release, a trip latch mechanism 4 movable to a position for releasing the trip mechanism 3 from a position for restricting the trip mechanism 3 by the driving force from the shifter mechanism 2, and an adjusting knob (see a reference numeral 10 in FIG. 4, a cam portion 9 formed at a lower portion of the adjusting knob is illustrated in FIG. 3) for adjusting a gap between the shifter mechanism 2 and the trip latch mechanism 4.

Three bimetals 1 may be disposed to correspond to each phase of three-phase Alternating Current (AC). The bimetals 1 provide the driving force for trip operation by bending by heat from a heater coil (not shown) generating heat at the time of an overcurrent occurrence.

The shifter mechanism 2 may be configured by cutting an integrated type horizontally-moving shifter to be separated into two shifter mechanisms, an upper horizontal move shifter 2*a* and a lower horizontal move shifter 2*b* so as to fit the three bimetals 1 for the three-phase AC thereinto based on measured position information of the bimetals 1. The shifter mechanism 2 may include a rotating shifter 2*c* rotatable depending on horizontal movement of the upper horizontal move shifter 2*a* and the lower horizontal move shifter 2*b* by connecting an upper portion and a lower portion thereof to the upper horizontal move shifter 2*a* and the lower horizontal move shifter 2*b*, respectively.

In FIGS. 3 and 5, a reference numeral 3 denotes a trip mechanism. The trip mechanism 3 is biased to be rotated in a direction of the trip operation by a spring (reference numeral not given). In FIGS. 3 and 5, the trip latch mechanism 4 serves to release the trip mechanism 3 to rotate in a direction of trip operation or restrict the trip mechanism 3 not to be rotated in the direction of trip operation. The trip latch mechanism 4 has one end portion installed to face a driving force transfer portion of the shifter mechanism 2 with each other so as to receive the driving force from the shifter mechanism 2, another end portion disposed on a rotation path (locus) of the trip mechanism 3 so as to restrict or release the trip mechanism 3, and a middle portion therebetween supported by a rotation shaft (reference numeral not given) to be rotatable. A reference numeral 6 denotes a contact point between the trip mechanism 3 and the trip latch mechanism 4 at the restriction position. In FIGS. 3 and 5, at a position contacting one portion of the latch mechanism 4, an adjusting knob mechanism 5 is disposed to be rotatable so as to displace the trip latch mechanism 4 to be closer to or to be more distant from the shifter mechanism 2 resulting from changes of a contact pressure while contacting the trip latch mechanism 4. Here, the adjusting knob mechanism 5 includes a cam portion 9 having a radius varying according to a displacement angle at a lower portion thereof, and an adjusting knob 10 coupled to the cam portion 9 or integrally extended from the cam portion 9 at an upper portion thereof so as to rotate the cam portion 9. As shown in FIG. 4, a set indication arrow for indicating a set value of a trip current is marked at a middle portion of an upper surface of the adjusting knob 10.

In FIG. 4, a reference character "a" indicates a trip operation current adjustable range. The range covers angles between a maximum trip operation insensitive adjusting position and a maximum trip operation sensitive adjusting position in the same manner as the related art.

Operation of the thermal overload protection apparatus in accordance with the present invention will be described.

Figure 1:
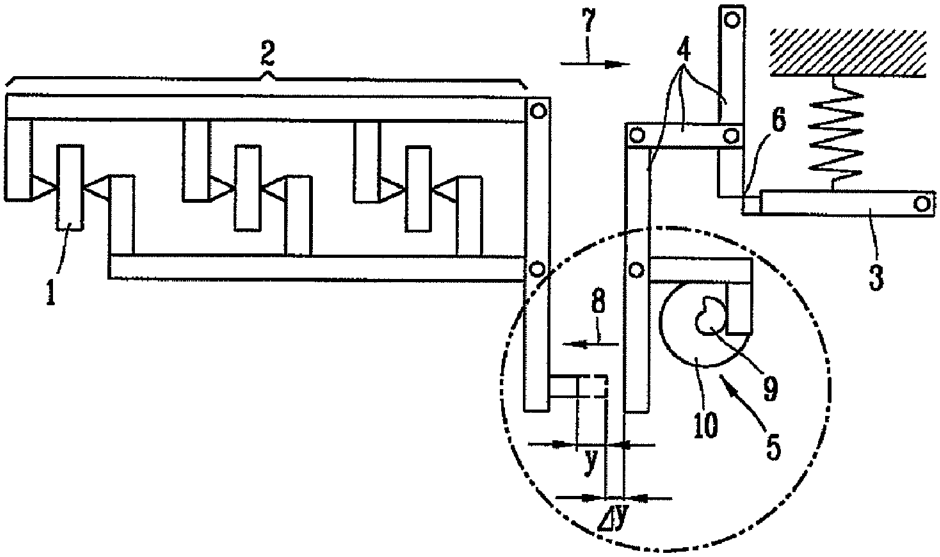
FIG. 1 RELATED ART
FIG. 1 is a diagram schematically showing a configuration of a thermal overload protection apparatus in accordance with the related art.
Figure 2:
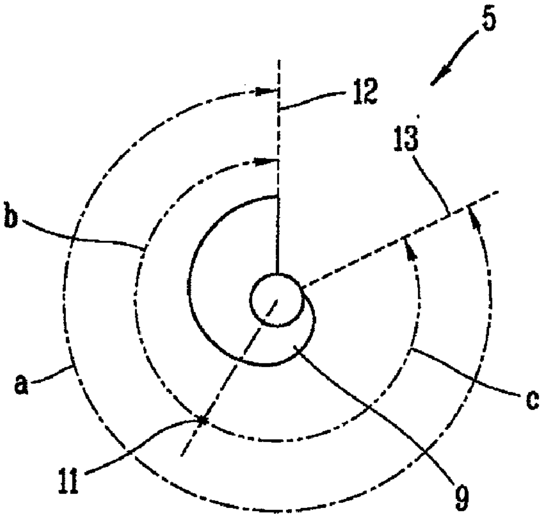
FIG. 2 RELATED ART
FIG. 2 is a diagram showing a relation between an adjusting knob, a cam portion and an adjusting area in the thermal overload protection apparatus in accordance with the related art.

First, the trip operation will be described. When the heater coil (not shown) generates heat by the overcurrent on the circuit, the bimetals 1 are bent and moved rightward in the drawing. Accordingly, the lower horizontal move shifter 2*b* to of the shifter mechanism 2 is moved rightward under a state that the upper horizontal move shifter 2*a* thereof is stopped on FIG. 1. Accordingly, the rotating shifter 2*c* is rotated in the counterclockwise direction and thus a lower end portion of the rotating shifter 2*c* rotates the trip latch mechanism 4 in the counterclockwise direction by pressing the trip latch mechanism 4 rightward as shown in FIG. 5. Then, the trip mechanism 3 being restricted by the trip latch mechanism 4 is released and then rotated in the direction of trip operation, that is in the counterclockwise direction on the drawing by an elastic force of the spring (reference numeral not given). A succeeding switching mechanism (not shown) is operated into a trip (circuit-opening) position and then the circuit is tripped (broken), thereby protecting the circuit and a load device.

Next, operation for adjusting a sensitivity at the time of a trip operation in accordance with a method for adjusting a trip sensitivity of the thermal overload protection apparatus in accordance with the present invention will be described with reference to FIGS. 6 to 10. The configuration of the thermal overload protection apparatus can be referred to by FIGS. 3 to 5.

Figure 6:
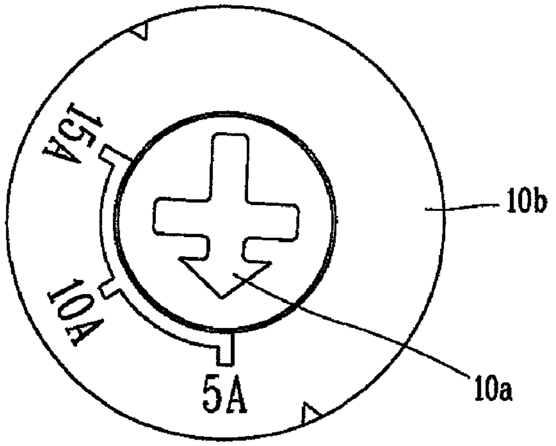
FIG. 6 is a planar view showing an adjusting knob, an adjusting reference point (arrow) and a graduation member for a set trip current assembled according to the present invention.
Figure 7:
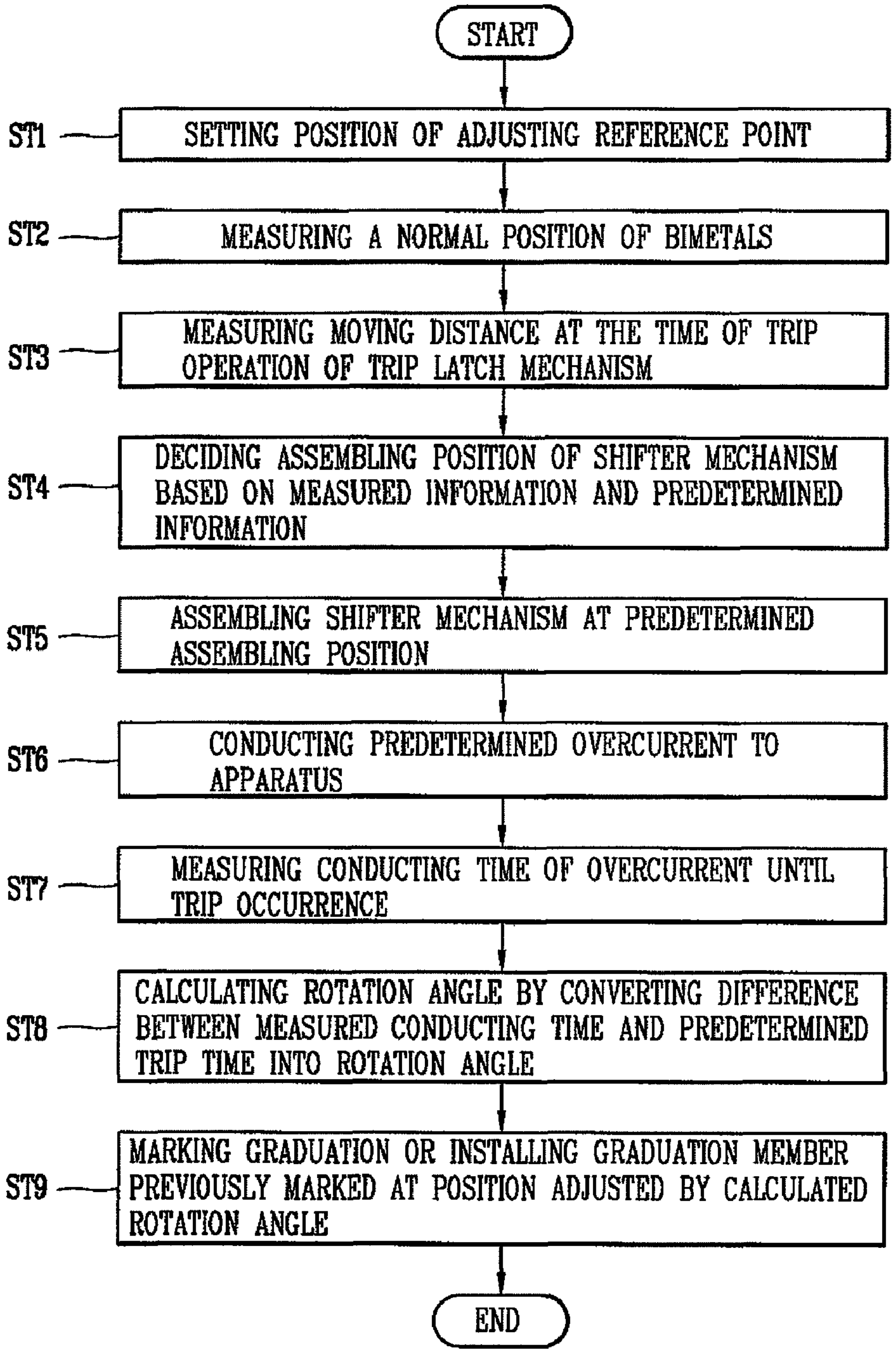
FIG. 7 is a flow chart showing a configuration of a method for adjusting a trip sensitivity of the thermal overload protection apparatus in accordance with the present invention.
Figure 8:
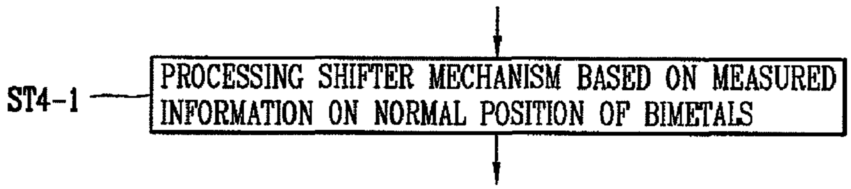
FIG. 8 is a flow chart showing a step that can be added to the method of FIG. 7.
Figure 9:
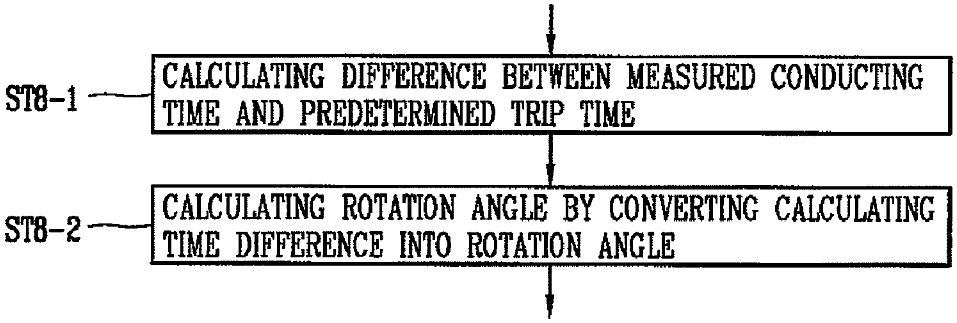
FIG. 9 is a flow chart showing a detailed configuration of a step 8 in the method of FIG. 7.
Figure 10:
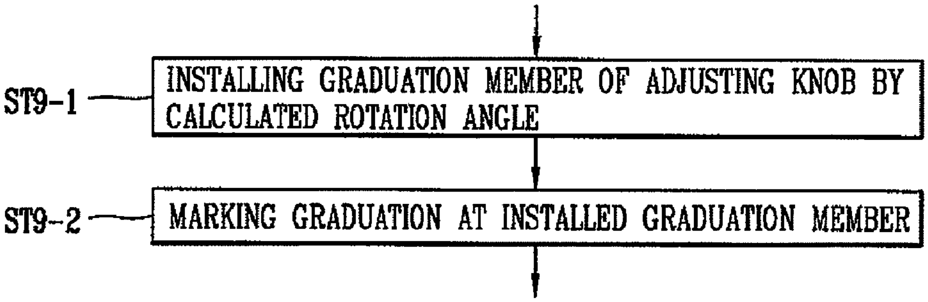
FIG. 10 is a flow chart showing a detailed configuration of a step 9 in the method of FIG. 7.

FIG. 6 is a planar view showing an adjusting knob (arrow), an adjusting reference point (arrow) and a graduation member for a set trip current assembled according to the present invention, FIG. 7 is a flow chart showing a configuration of a method for adjusting a trip sensitivity of the thermal overload protection apparatus in accordance with the present invention, FIG. 8 is a flow chart showing a step that can be added to the method of FIG. 7, FIG. 9 is a flow chart showing a detailed configuration of a step 8 in the method of FIG. 7, and FIG. 10 is a flow chart showing a detailed configuration of a step 9 in the method of FIG. 7.

The method for adjusting the trip sensitivity of the thermal overload protection apparatus in accordance with the present invention can be applied to the thermal overload protection apparatus including the bimetals 1 for providing a driving force for trip operation by being bent when an overcurrent is conducted in a circuit, the shifter mechanism 2 for transferring the driving force from the bimetals 1 by contacting the same, the trip mechanism 3 rotatable to a trip position at which the circuit is broken at a time of release, the trip latch mechanism 4 movable to a position for releasing the trip mechanism 3 from a position for restricting the trip mechanism 3 by the driving force from the shifter mechanism 2, and the adjusting knob 10 for adjusting a gap between the shifter mechanism 2 and the trip latch mechanism 4.

The method for adjusting the trip sensitivity (hereafter, referred to as an adjusting method) of the thermal overload protection apparatus in accordance with the present invention, as shown in FIG. 7, may include measuring a position of the bimetals 1 and a moving distance at the time of trip operation of the trip latch mechanism 4 so as to determine a gap between the shifter mechanism 2 and the trip latch mechanism 4 (see reference numerals ST2 and ST3 in FIG. 7); deciding an installing position (assembling position) for the shifter mechanism 2 based on the position information and distance information obtained by the measuring step (ST2 and ST 3 in FIG. 7) and a predetermined trip distance information (ST4); processing the shifter mechanism 2 according to the position information of the bimetals 1 (see a reference numeral ST4-1 in FIG. 8); installing (assembling) the processed shifter mechanism 2 at the installing position (assembling position) decided in the step ST4 (ST5); and deciding a graduation position of a trip operation current value by converting (calculating) a difference between a predetermined allowable trip operation time and a test-operated trip operation time into a rotation angle (see ST6 through ST8).

In detail, the steps ST2 and ST3 may include measuring a position of the bimetals 1 when a normal current is conducted on the circuit (ST2); and measuring the moving distance of the trip latch mechanism 4 by arbitrarily moving the same in the direction of trip operation (ST3).

Prior to the steps ST2 and ST3, the adjusting method in accordance with the present invention may include setting a position of an adjusting reference point for the adjusting knob 10 (ST1). The setting step ST1 is implemented by manually rotating the adjusting knob 10 by an initially-set angle so as for a set indication arrow 10*a* shown in FIGS. 4 and 6 to indicate any angle within the cam adjustable range, that is the trip operation current adjustable range a shown in FIG. 4.

The measuring step ST2 is implemented by measuring the position information of the bimetals 1 when the normal current is conducted on the circuit using various length measurement devices.

At the time of trip operation of the trip latch mechanism, the measuring step ST3 may be implemented by arbitrarily moving the trip latch mechanism 4 in the trip operation direction (rightward on FIGS. 3 and 5) and then measuring the distance from the initial position of the trip latch mechanism 4 to a position at a moment of the trip occurrence, using various length measurement devices same as the abovementioned step.

The deciding step ST4 is implemented based on the position information and distance information obtained by the measuring step (see ST2 and ST3 in FIG. 7) and the predetermined trip distance information. Here, the predetermined trip distance information indicates a bending amount (bending distance, see the reference numeral y in FIG. 1) of the bimetals 1 that can be previously calculated according to a conducting allowable time for the overcurrent corresponding to a specified magnification of a rated current (105%, 120%, etc. of the rated current) specified in an international electrical standard, an international electrical safety standard, etc.

According to the position information of the bimetals 1, the processing step (ST4-1 in FIG. 8) may be implemented by cutting the integrated type shifter mechanism 2 into the upper and lower shifter mechanisms so as to receive the three bimetals 1 for the three-phase by fitting the same thereinto based on the position information of the bimetals obtained by the step ST2.

The installing (assembling) step ST5 is implemented by installing (assembling) the processed shifter mechanism 2 at the installing position (assembling position) decided in the step ST4.

The deciding step (see ST6 through ST8) may include conducting the predetermined overcurrent to the thermal overload protection apparatus (ST6); measuring an overcurrent conducting time until the trip occurrence (ST7); and calculating the rotation angle by converting the difference between the conducting time measured in the measuring step ST7 and the predetermined trip time into the rotation angle of the adjusting knob 10 (ST8).

The calculating step ST8 may be implemented by converting the rotation angle of the adjusting knob 10 by an operation formula predefined considering the measured conducting time, the distance between the installed shifter mechanism 2 and the trip latch mechanism 4 and the trip time pre-determined by the standard.

The calculating step ST8, as shown in FIG. 9, may be subdivided into calculating the difference between the measured conducting time and the predetermined trip time (ST8-1); and calculating the rotation angle by converting the difference of time calculated in the calculating step ST8-1 into the rotation angle of the adjusting knob 10 (ST8-2).

The adjusting method in accordance with the present invention may further include marking a graduation (ST9) of the trip operation current from the position of the adjusting reference point initially set in the setting step ST1 to a position adjusted by the rotation angle calculated in the calculating step ST8.

As another embodiment, the adjusting method in accordance with the present invention may be interchanged with installing a graduation member in which the graduation of the trip operation current is previously marked at the position adjusted by the rotation angle calculated in the calculating step ST8.

The marking step ST9 may include installing a graduation member 10*b* at a periphery of the adjusting knob 10 by the rotation angle calculated in the calculating step ST8 (ST9-1); and marking the graduation at the graduation member (ST9-2).

In accordance with another embodiment, the marking step ST9 may include marking the graduation at the graduation member by previously defining the trip operation current to be operated according to the rated current, and installing the graduation member at the position adjusted by the rotation angle calculated in the calculating step ST8.

Figure 11:
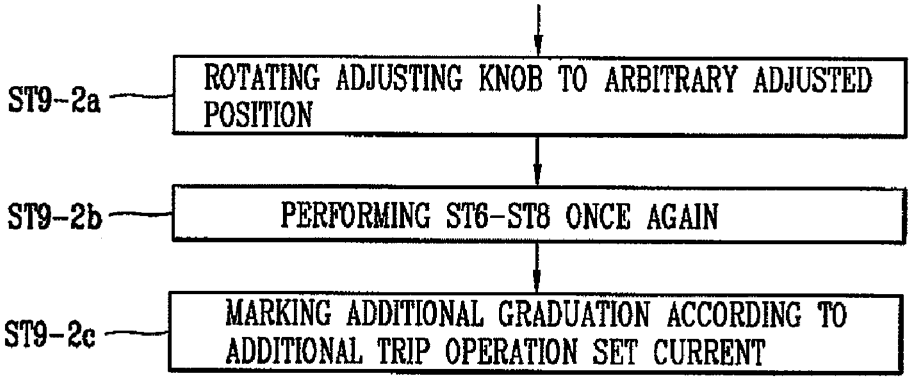
FIG. 11 is a flow chart showing a configuration of an adjusting method for selecting and setting multiple rated currents in accordance with the present invention.

In the meantime, so as to allow the thermal overload trip apparatus to variously select the current to perform the trip operation by a user, the marking step ST9, as shown in FIGS. 7 and 11, may include marking the graduation at the periphery of the adjusting knob 10 of the position adjusted by the rotation angle calculated in the calculating step ST8 from the position of initially-set adjusting reference point (ST9); adjusting the adjusting knob 10 by rotating to a temporary adjusting position so as to mark a graduation for an additional trip operation set current for selectively setting another trip operation current (ST9-2*a*); performing the steps such as the conducting step ST6, the measuring step ST7 and the calculating step ST8 with respect to the another trip operation current once again (ST9-2*b*); and marking a graduation for an additional trip operation current at a rotation position at the periphery of the adjusting knob that has been adjusted by the rotation angle calculated in the calculating step ST9-2*b* (ST9-2*c*).

A non-limiting feature of the present invention is capable of obtaining the method for adjusting the trip sensitivity of the thermal overload protection apparatus which is capable of precisely and effectively adjusting the trip operation sensitivity at the time of overload (overcurrent) occurrence.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for adjusting a trip sensitivity of a thermal overload protection apparatus, the thermal overload protection apparatus comprising bimetals for providing a driving force for trip operation by being bent when an overcurrent is conducted in a circuit, a shifter mechanism for transferring the driving force from the bimetals by contacting the bimetals, a trip mechanism rotatable to a trip position at which the circuit is broken at a time of release, a trip latch mechanism movable to a position for releasing the trip mechanism from a position for restricting the trip mechanism by the driving force from the shifter mechanism, and an adjusting knob for adjusting a gap between the shifter mechanism and the trip latch mechanism, the method comprising:

measuring a position of the bimetals and a moving distance at the time of trip operation of the trip latch mechanism so as to determine a gap between the shifter mechanism and the trip latch mechanism;

determining an installing position for the shifter mechanism based on the position information and distance information obtained by said measuring and a predetermined trip distance information;

processing the shifter mechanism according to the position information of the bimetals;

installing the processed shifter mechanism at the determined installing position; and determining a graduation position of a trip operation current value by converting a difference between a predetermined allowable trip operation time and a test-operated trip operation time into a rotation angle.

2. The method of claim 1, wherein said processing the shifter mechanism comprises cutting the shifter mechanism to be separated into the upper and lower shifter mechanisms so as to receive the three bimetals for three-phase AC by fitting the three bimetals into the upper and lower shifter mechanisms based on the position information of the bimetals.

3. A method for adjusting a trip sensitivity of a thermal overload protection apparatus, the thermal overload protection apparatus comprising bimetals for providing a driving force for trip operation by being bent when an overcurrent is conducted in a circuit, a shifter mechanism for transferring the driving force from the bimetals by contacting the bimetals, a trip mechanism rotatable to a trip position at which the circuit is broken at a time of release, a trip latch mechanism movable to a position for releasing the trip mechanism from a position for restricting the trip mechanism by the driving force from the shifter mechanism, and an adjusting knob for adjusting a gap between the shifter mechanism and the trip latch mechanism, the method comprising:

setting a position of an adjusting reference point for the adjusting knob;

measuring a position of the bimetals when a normal current is conducted in the circuit;

measuring a moving distance of the trip latch mechanism by arbitrarily moving the same in a direction of trip operation by the time of trip event;

determining an assembling position for the shifter mechanism based on the measured moving distance when the trip latch mechanism performs the trip operation, information on a predetermined trip distance between the shifter mechanism and the trip latch mechanism, and information on a size of the shifter mechanism;

assembling the shifter mechanism at the determined assembling position;

conducting a predetermined overcurrent to the thermal overload protection apparatus;

measuring a conducting time for the overcurrent until a trip event;

calculating a difference between the conducting time measured in said measuring the conducting time for the overcurrent and a predetermined trip time by converting the difference into a rotation angle; and marking a graduation of the trip operation current from the position of the adjusting reference point initially set in said setting the position to a position adjusted by the rotation angle calculated in said calculating.

4. The method of claim 3, further comprising processing the shifter mechanism based on information on the position of the bimetals at the time of conducting the normal current in the circuit that is measured in said measuring the normal position of the bimetals, between said determining the assembling position of the shifter mechanism and said assembling the shifter mechanism.

5. The method of claim 4, wherein said processing the shifter mechanism is implemented by cutting the shifter mechanism to be separated into the upper and lower shifter mechanisms so as to receive the three bimetals for three-phase AC by fitting the three bimetals into the upper and lower shifter mechanisms based on the position information of the bimetals.

6. The method of claim 3, wherein said calculating the rotation angle comprises:

calculating the difference between the measured conducting time and the predetermined trip time; and calculating the rotation angle by converting the difference of time calculated in said calculating the time difference into the rotation angle.

7. The method of claim 3, wherein said marking the graduation comprises:

installing a graduation member at a periphery of the adjusting knob by the rotation angle calculated said calculating the rotation angle; and marking the graduation at the graduation member.

8. The method of claim 3, wherein said marking the graduation comprises marking the graduation at a periphery of the adjusting knob located at the position adjusted by the rotation angle calculated in said calculating the rotation angle from the position of the set adjusting reference point.

9. The method of claim 3, wherein said marking the graduation comprises:

installing a graduation member at a periphery of the adjusting knob by the rotation angle calculated in said calculating the rotation angle;

marking the graduation at the graduation member;

adjusting the adjusting knob by rotating to a temporary adjusting position so as to mark a graduation for an additional trip operation set current for selectively setting another trip operation current;

again performing said conducting the overcurrent, said measuring the overcurrent conducting time, and said calculating the rotation angle; and marking a graduation for an additional trip operation current at an adjusted rotation position of the adjusting knob that has been adjusted by the rotation angle calculated in said calculating the rotation angle.

10. The method of claim 3, wherein said marking the graduation comprises:

marking the graduation at a periphery of the adjusting knob of the position adjusted by the rotation angle calculated in said calculating the rotation angle from the position of the set adjusting reference point;

adjusting the adjusting knob by rotating to a temporary adjusting position so as to mark a graduation for an additional trip operation set current for selectively setting another trip operation current;

again performing said conducting the overcurrent, said measuring the overcurrent conducting time, and said calculating the rotation angle; and marking a graduation for an additional trip operation current at an adjusted rotation position of the adjusting knob that has been adjusted by the rotation angle calculated in said calculating the rotation angle.

* * * * *